Figure 1:
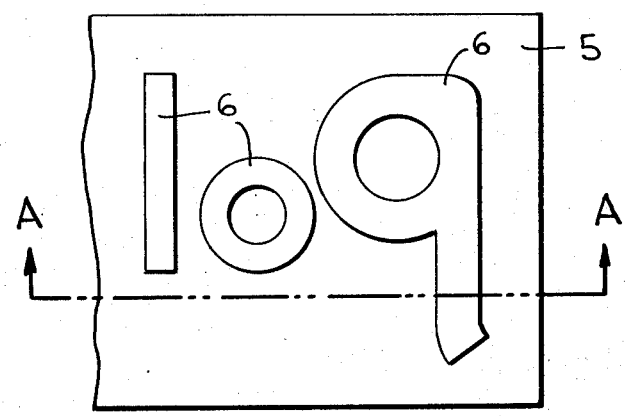

United States Patent [19]

Day et al.

[11] 3,992,559

[45] Nov. 16, 1976

[54] HEAT SEALABLE LABELS

[75] Inventors: Ian Day; John Carlton Greenwood, both of London, England

[73] Assignee: Polymark Limited, England

[22] Filed: Aug. 31, 1973

[21] Appl. No.: 393,486

Related U.S. Application Data

[63] Continuation of Ser. No. 143,591, May 14, 1971, abandoned, which is a continuation-in-part of Ser. No. 795,528, Jan. 31, 1969, abandoned, which is a continuation-in-part of Ser. No. 702,522, Feb. 2, 1968, abandoned.

[30] Foreign Application Priority Data

Feb. 2, 1968  United Kingdom............... 5539/68

[52] U.S. Cl................................ 428/200; 427/148; 427/152; 428/202; 428/204
[51] Int. Cl.$^2$...................... B32B 3/00; B32B 7/06; B32B 7/10
[58] Field of Search............. 117/3.4, 122 H, 161 P, 117/161 LN; 260/72 N, 29.4 R, 849; 428/202, 204, 200; 427/148, 152

[56] References Cited

UNITED STATES PATENTS

| 2,430,860 | 11/1947 | Cairns................................ 117/161 |
| 2,629,679 | 2/1953 | Ratke................................ 117/3.4 |
| 2,762,719 | 9/1956 | Kleiner et al...................... 117/161 |
| 2,882,185 | 4/1959 | Valko et al........................ 117/161 |
| 2,957,783 | 10/1960 | Dachs et al........................ 117/161 |
| 3,012,986 | 12/1961 | Maringer et al.................... 260/849 |
| 3,063,869 | 11/1962 | Roth.................................. 260/849 |
| 3,355,409 | 11/1967 | Bissot................................ 260/29.6 |
| 3,359,127 | 12/1967 | Meyer et al........................ 117/161 |
| 3,386,940 | 6/1968 | Tuites................................ 260/29.4 |
| 3,684,564 | 8/1972 | Lefrancois.......................... 117/3.4 |

FOREIGN PATENTS OR APPLICATIONS

| 380,306 | 9/1932 | United Kingdom |
| 563,098 | 7/1944 | United Kingdom |

OTHER PUBLICATIONS

Chemical Abstracts 60, 8144(d) (1964), The Preparation of Copolyamide.
Preuss, Metal Finishing, vol. 62, 1964 "Synthetic Resins" pp. 75–87.

*Primary Examiner*—Harry J. Gwinnell
*Assistant Examiner*—Dennis C. Konopacki
*Attorney, Agent, or Firm*—Watson, Cole, Grindle & Watson

[57] ABSTRACT

The invention relates to the labelling of textile and other flexible sheet articles in which a marking element is used which is adapted to be attached and bonded to the article by heat and pressure, said element including a heat-curing film-forming resin system in the presence of blocked cross-linking groups and under acid conditions, such resin system becoming heat-cured during the attachment of the marking element to the article to form an inert, insoluble and wear-resistant marking on the surface of the article. The resin system may be an alcohol-soluble copolyamide in the presence of a cross-linking agent which may be a precondensed alcohol-modified formaldehyde or aminoplast resin containing alkoxy alkyl groups; or it may be a dispersion of a film-forming addition resin system at least one monomer of which contains groups capable of reacting with similar cross-linking agents or comonomers bearing alkoxy-alkyl groups.

14 Claims, 4 Drawing Figures

HEAT SEALABLE LABELS

The present invention relates to marking elements especially for labelling textile articles, and to methods of marking articles by means of such elements, and is a continuation of application Ser. No. 143,591, filed May 14, 1971 (now abandoned), which is a continuation-in-part of application Ser. No. 795,528, filed Jan. 31, 1969 (now abandoned), which in turn is a continuation-in-part of application Ser. No. 702,522, filed Feb. 2, 1968 (now abandoned).

U.S. Pat. No. 3,359,127 is concerned with the application of markings to textile products by meat-sealing, particularly for the purpose of producing marking elements permanently bonded to a textile article by means of a marking element which comprises a pattern marking and a support surface, and having a solubilised linear polyamide on the face of said element which is placed in contact with a textile product, the assembled marking element and textile product being thereafter subjected to heat and pressure to form a label-like marking on said textile product, which is resistant to the influences of mechanical abrasion and wear and of cleaning agents to which the textile product is subjected.

The solubilised linear polyamides disclosed therein are fibre- or film-forming synthetic linear polyamides such as are commonly designated as nylon which have been converted into a soluble form by treatment with an aldehyde, for example formaldehyde, as described in the Cairns U.S. Pat. No. 2,430,860.

The present invention is concerned with improved resin systems for use in such marking elements whereby marking of articles can be effected more expeditiously and at a lower cost, and is based on the use of a heat-curing film-forming resin system in the presence of blocked, cross-linking groups and under acid conditions, said resin being heat curable to form an inert, insoluble and wear-resistant marking on said surface. The film-forming resin system may comprise in all a number of different types of resin, for example polyamide resins or addition resins, and the resin system concerned incorporates certain groupings as specified below, which groupings may be distributed along two or more components of the resin system, that is to say that each grouping referred to, such as a cross-linking grouping or an acidic grouping, may be present by virtue of a different component in the resin system, or a single component may comprise two or more of such groupings.

In all cases one essential component is a film-forming resin system, incorporating plasticisers and coalescing solvents if necessary bearing functional groups such as hydroxyl, amino, amido or carboxyl groups, and at least one other component is present providing the following additional groupings:

1. Cross-linking groupings which are blocked or de-activated by substitution, such as methoxy-methyl or ethoxy-methyl groups in which de-activation is obtained by virtue of the substituted methylol group, 2. Acidic groupings for promoting curing or cross-linking of the system, which groupings may be attached to the film-forming resin molecule or to the cross-linking compound, or such groupings may be present as organic acids, weak inorganic acids or acid-yielding substances which acids or substances are inactive at normal room temperature but become effective to promote curing of the resin at the higher temperatures used for heat-sealing the marking element to a surface to be marked.

An important advantage of the resin systems used according to the invention is the ability to provide a marking element such as a label having a relatively long storage life thereby permitting marking labels to be produced by a manufacturer and supplied to a customer without any severe restriction as to the time limit before which the labels must be bonded to a textile article; for example there is no difficulty in providing a storage life of six to twelve months. Nevertheless despite the relatively long storage life the marking elements or labels described herein are capable of being bonded to a textile article to be marked at a moderate temperature not exceeding 250° C which is not likely to damage the marked article and yet with a comparatively short hot pressing period of the order of 3 — 15 seconds.

These resin systems hereinafter referred to as the "specified resin system" permit the production of heat-sealable labels, transfers or the like which are capable of being converted by the action of heat into permanent, highly insoluble, inert and wear-resistant compounds which are for example capable of resisting cleaning operations carried out on a labelled article, including laundry operations and dry cleaning (chemical cleaning) operations.

Labelling of articles according to the invention is based on heat-sealing a label or like marking element by means involving the presence of blocked cross-linking groups under said conditions. Under the effect of heat (and with the label applied under pressure) a cross-linking reaction occurs which results in the production of a highly inert, insoluble and resistant bonding compound.

An important advantage of the present invention is that it makes it possible to provide permanent labelling by a heat-sealing action while avoiding the need for the comparatively expensive solubilised nylon-type polyamide compounds previously required.

A marking element, label, heat transfer or the like may for example comprise any of a number of resin systems, which provides at least an information marking and preferably a protective covering. In some cases an information marking is supported on a continuous layer of synthetic resin film or is sandwiched between two such layers and at least that resin film which is brought into bonding contact with the article, and the resin film which is to be exposed surface after bonding to the article, are formed from the specified resin system and the information-bearing marking at least consists of a pigmented resin.

Such marking element may include at least a printed information-bearing layer formed from an ink comprising such a resin system and a protective layer formed from the said film-forming resin system which may cover the marking areas only or may be a continuous layer. In an alternative arrangement the marking element comprises two continuous layers formed of such resin system and an information-bearing marking sandwiched between them, which is formed by any convenient printing process using a compatible binder medium for the printing ink to form the information-bearing marking.

In other arrangements the continuous layer can be replaced by a layer of unpigmented resin printed only over the marking areas if so desired. Alternatively the marking element may comprise only the information marking matter in the form of pattern areas formed from the specified resin system, the amount of resin being such that adequate bonding to the fabric occurs, with adequate resistance to cleaning.

Such a marking element may be self-supporting or it may be supported by a temporary support providing release properties. The latter construction may be in the form of a heat transfer in which a temporary support, formed wholly of a material having release properties, is used or of a sheet of paper coated or laminated with a polyethylene terephthalate foil having release properties, receives a printed marking formed in one or more colours from a printing ink or inks the binder of which is formed by the specified resin system. Such printing may conveniently be performed repetitively by silk screen printing methods so that a large number of marking elements are produced simultaneously on a single sheet from which individual marking elements are cut before application to article to be marked. The printed sheet may then be overcoated by means of a continuous layer of the specified resin system, this overcoating forming the surface which bonds the marking element to the articles to be marked. A pigmented layer to provide a background for the information-bearing marking may be applied before the final bonding layer, both layers consisting of the specified resin system. In some cases however the said pigmented layer or the said bonding layer may be printed over each marking element area only. This is convenient because the marking elements so formed may be arranged with a non-adherent portion at one edge at least which provides a finger grip to assist removal of the temporary support after the marking element has been heat-sealed to the article to be marked.

Marking labels produced in this way are suitable for attachment to textile articles or other flexible sheet-like material, such as leather or leather substitutes, and are applied under heat and pressure to the surface to be marked, with the overcoating or continuous layer of the specified resin system in immediate contact with the surface to be marked. As a result the label becomes permanently bonded to the article and, due to the release properties of the temporary support, the latter may then be removed leaving the label in place.

By virtue of the chemical reaction occurring within the resinous composition during the heat-sealing, cross-linking takes place providing a highly inert and resistant marking on the textile or other surface to which the marking element has been attached, and this marking can if required be made so resistant as to remain effective throughout the useful life of the article and not liable to be degraded or defaced or rubbed away by influences to which the marked article may be subjected during its useful life, being in particular resistant to repeated laundering and dry-cleaning.

Copolyamide resin systems may be used which are soluble in alcohol/water mixtures and which are formed by copolymerising at least one diamine, at least one aliphatic diacid and at least one further compound which is a lactam or an aliphatic diacid or diamine. At least one additional compound provides a blocked cross-linking grouping and an acid grouping.

Other resins which may be used include addition polymers in which the resin system comprises at least one film-forming monomer and in which the system includes reactive groups, groups having a cross-linking action, and acidic groups or acid-yielding groups. In general the addition polymers used in accordance with the present invention are copolymers formed from two or more monomers at least one of which is of film-forming character, and the following groups are appropriately distributed among the monomers or associated with separate compounds included with them, namely:
1. reactive groups,
2. cross-linking groups,
3. acidic groups or acid-forming groups.

In many cases one of the monomers, which will be referred to as the reactive monomer, includes reactive groups for example:
$CONH_2$ - introduced by acrylamide for example,
$NH_2$ - introduced by vinyl amino-acetate for example,
$CO_2H$ or $CO_2NH_4$ - introduced by acrylic acid or maleic anhydride,
SH, or like groups or $SO_3H$ introduced as vinyl sulphonic acid.

Conveniently the reactive monomer may be associated with at least one and preferably two other monomers capable of forming a copolymer having appropriate film-forming properties, and the resin system includes a cross-linking agent.

Additional resins are convenient because they are available in the form of resin dispersions and can in many cases be used in the form in which they are supplied by the makers, although alternatively the solid resins can be precipitated, dried and dissolved in a solvent such as acetone or ethyl acetate.

In some cases the acrylic resins have sufficient acid groups and do not require an additional acid-curing agent although an acid or an acid-yielding compound can be added if desired or alternatively a volatile base whereby the rate of cross-linking can be readily increased or decreased as required.

Copolyamides used in accordance with the present invention are soluble in blends of lower aliphatic alcohols ($C_1$ - $C_5$ alcohols) and water. This solubility is presumably due to irregularity of the polyamide chain and consequent reduction in hydrogen bonding strength. The diamines used in the production of such copolyamides may be hexamethylene diamine, tetramethylene diamine, decamethylene diamine, 3-methyl-hexamethylene-diamine, bis-(aminocyclohexyl) methane (ACHM), or bis-(aminocyclohexyl)-2:2-propane. Straight chain diacids are for example adipic acid, sebacic acid, or azelaic acid. Examples of lactams are ε-caprolactam, or ω-undecanolactam.

Thus the invention may include the use in any combination of the monomers used for nylon compounds normally referred to as Nylon 6, Nylon 6/6, Nylon 6/10 and Nylon 11 and including both binary copolymers such as Nylon 6:6/6 or multiple copolymers such as Nylon 6:6/6:6/10, Nylon 6:11:4/6, 6:ACHM/8:11:8/4, etc. The copolymers selected are however those which are soluble in predominantly alcoholic solvents such as for example alcohol/water mixtures containing 60% – 90% by volume of a lower aliphatic alcohol such as methyl, ethyl, propyl or butyl alcohol. If desired concentrated solutions of the resins can be prepared which can be diluted for coating or spreading.

It will be noted that the nylon-type copolyamides referred to involve mainly straight chain monomers although in some cases cyclic monomers are included. Soluble nylons from branched chain monomers are not generally suitable for the purposes of the present invention because of reduced reactivity of the amide groups due to steric hindrance. However, a limited degree of branching may be acceptable, for example when using 3-methyl-hexamethylene diamine, but this degree of branching does not affect the required properties.

Resin systems having the required properties will be found among compounds having a molecular weight measured by end group analysis lying between 5,000 and 30,000 with a preferential range between 8,000 and 20,000.

Such copolyamides are used in the form of compositions which include blocked cross-linking agents, which can be for example compounds containing alkoxyalkyl groups which are ineffective for inducing cross-linking of the resin molecule at room temperature by virtue of the presence of the alkyl group. Such copolyamides form part of a resin system containing between 5% to 30% by weight of a cross-linking agent selected from Table I below. Such agents are for example monomeric or partially polymerised or pre-condensed alcohol-modified melamine formaldehyde or urea formaldehyde resins, in particular melamine compounds containing alkoxyalkyl groups. For example the following compounds may be used:

Table I

N,N'-bis(methoxymethyl) urea,
tri-methoxymethyl melamine,
hexa-methoxymethyl melamine,
tetra-methoxymethyl urea,
urea-formaldehyde precondensates containing methoxymethyl groups,
melamine formaldehyde precondensates containing methoxymethyl groups,
hexa-ethoxymethyl melamine,
urea-formaldehyde precondensates containing ethoxymethyl groups,
melamine-formaldehyde precondensates containing ethoxymethyl groups,
N,N'-bis(methoxymethyl)-meta-phenylenediamine,
alkylated melamine or urea resin precondensates butylated Cross-linking properties may also be obtained by copolymerisation of suitable monomers which produce a copolymer having film-forming properties. Thus N-alkoxy alkyl groups may be introduced into addition resins by using as one of the monomers N-butoxymethyl acrylamide.

The specified resin systems are operative for curing under heat-sealing conditions by the inclusion of acidic compounds or groups. Such compounds may be solid organic acids or acid-yielding compounds but if the film-forming resin itself is of an acid character or is acid-yielding at an elevated temperature no additional acid need be present.

Cross-linking compounds are chosen which are soluble in the same solvents as the copolyamides, such as alcohol/water mixtures, permitting concentrated coating or spreading mixtures to be obtained which can be diluted before coating. The specified resin system composition may further include a curing agent formed by an acid grouping or a substance of acid reaction which corresponds to a free acid having a pK value greater than 2. Such curing agents consist preferably of weak inorganic acids or those organic acids which are solid at normal temperatures, for example maleic acid, lactic acid or citric acid. Further examples of such curing agents are partially esterified phosphoric acids and anhydrides of organic acids. In the case of addition polymers one of the monomers may consist for example of acrylic acid, methacrylic acid or vinyl acetic acid. Compounds can be used which yield acids at elevated temperatures such as those required for carrying out the heat-sealing operation. Such compounds may be for example salts of volatile bases such as the ammonium or amine salts or anhydrides of suitable acids.

The solvent used in making up the specified resin coating or spreading composition may contain additional components such as trichlorethylene. In general a water/alcohol mixture containing 70% to 90% by volume of a lower aliphatic alcohol may be used, and this solution may contain up to 15% of trichlorethylene.

The preparation of a copolyamide coating or spreading composition may be effected by mixing the alcohol/water solution of a copolyamide with a cross-linking agent such as a formaldehyde resin in a compatible solvent mixture and containing the curing agent. The amount of curing agent will range between 0.1% and 7% by weight computed on the total resin content, i.e. the copolymer or the copolyamide and the formaldehyde resin.

The two solutions are mixed at room temperature and the curing agent may if desired be added at that stage. The mixed solutions are homogeneous and stable at normal temperature and may be prepared in advance of use. The curing agents added to the resin are substantially inactive at room temperature and consequently the solutions can be stored for a reasonable period and the marking elements also have a substantial shelf life enabling them to be stored by the purchaser ready for use.

Of course the usual auxiliary agents may be added such as plasticisers, pigments, dyes, wetting agents and so on such as are required for producing coatings having the required properties.

As applied to a preferred method for the production of a heat transfer, a temporary support, consisting of a suitable paper or like material preferably coated with a release agent, such as a film or polyethylene terephthalate or a solution of silicone resin, receives a specified resin system composition which is coated or spread thereon, dried and then the information-bearing marking is printed using a printing ink in which the medium comprises one of the said specified resin systems and after drying a further coating of one of the said specified resin systems may be applied and dried. Additional layers may be present for example pigmented layers to provide a background for the information-bearing layer or in some cases the transfer may be simplified to consist of the information-bearing marking printed directly on the temporary support and overcoated with a layer of one of the specified resin systems which may be continuous or printed over the design area only. At all stages the drying is effected at a temperature below that at which any substantial cross-linking occurs.

Figure 2:
Figure 3:
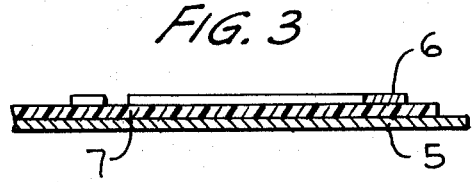
Figure 4:
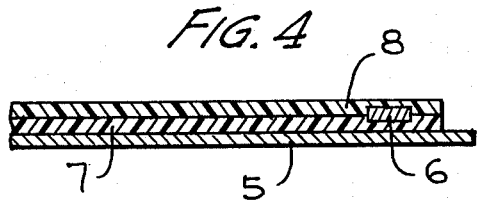

Several examples are shown by way of example on the accompanying drawings in which: FIG. 1 shows part of a simple transfer, and FIGS. 2, 3 and 4 are sectional views on the line A—A of FIG. 1 showing various arrangements.

A temporary support 5 is provided with a design or marking 5. In FIG. 1 the marking 6 is printed direct on to the support 5. In FIG. 3 there is a continuous under layer 7 which forms an outer layer after transfer. In FIG. 4 the design or marking 6 is sandwiched between an under layer 7 and an outer layer 8. The design or marking 6 in FIG. 2, the design or marking 6 and the layer 7 in FIG. 3 and at least the layer 8 in FIG. 4 are produced from one or more of the specified resin systems according to the present invention. Such a heat transfer applied under heat and pressure as described in U.S. Pat. No. 3,359,127 provides an inert, cleaning-resistant and abrasion-resistant marking on a textile or other article, which marking may remain effective throughout the useful life of the article.

Specific examples of suitable copolyamide resins are given below in Table II. Such resins are prepared by conventional nylon methods, e.g. by charging the nylon salts and/or lactams into an autoclave, followed by heating at 180° – 300° C until the melt viscosity corresponding to the desired molecular weight is reached, when the reaction is stopped and the resin is removed and granulated.

Table II

| | All parts in items 1 to 5 below are by weight. | | |
|---|---|---|---|
| 1. | ε-caprolactam | 40 | parts |
| | hexamethylene diamine adipate | 60 | " |
| 2. | ε-caprolactam | 25 | " |
| | hexamethylene diamine adipate | 30 | " |
| | tetramethylene diamine sebacate | 45 | " |
| 3. | ω-undecanolactam | " | parts |
| | ε-caprolactam | 35 | " |
| | octamethylene diamine azelate | 30 | " |
| 4. | ACHM adipate | 20 | " |
| | hexamethylene diamine adipate | 40 | " |
| | ε-caprolactam | 20 | " |
| | hexamethylene diamine sebacate | 20 | " |
| 5. | hexamethylene diamine adipate | 21 | " |
| | ε-caprolactam | 54 | " |
| | hexamethylene diamine sebacate | 25 | " |

In an alternative method of producing copolyamide resins the diamines and diacids are added as separate components and not as salts. In this way an increased solubility of the resin system may be obtained. Typical examples are shown in Table III.

Table III

| 6. | ε-caprolactam | 0.2 | mole fraction |
|---|---|---|---|
| | hexamethylene diamine | 0.4 | " |
| | adipic acid | 0.2 | " |
| | sebacic acid | 0.2 | " |
| 7. | ω-undecanolactam | 0.3 | " |
| | tetramethylene diamine | 0.2 | " |
| | dodecamethylene diamine | 0.15 | " |
| | suberic acid | 0.05 | " |
| | adipic acid | 0.3 | " |

EXAMPLE 1

This example illustrates a heat transfer according to the invention and corresponds to FIG. 4.

A temporary support 5 (which may be similar to the support 11 in the said Patent) is coated with a continuous layer 7 (of thickness of 20 microns when dry) formed from a mixture compounded as follows:

15 gm. of a copolyamide selected from tables II and III, and 3 gm. of N-ethyl toluene sulphonamide as plasticiser are dissolved in 76 gm. of a 80/20 by volume mixture of butanol and water. The mixture is heated to 50° to 60° C with stirring until the copolyamide is completely dissolved and then the mixture is cooled to room temperature and 6 gm. of a cross-linking agent selected from the above table is added. Then 1 gm. of lactic or citric acid is added and the coating mixture is then ready and can be stored for use when required. After coating the support, the coated product is dried at between 30° and 80° C. Substantially no curing occurs in either case.

The coated support is printed in reverse with a repetitive pattern in one or more colours consisting of the desired pattern as shown at 6, the complete sheet thus comprising a number of printed areas from which the marking elements will be subsequently cut. Printing is conveniently effected by silk screen printing using a printing ink compounded as follows:

| Pigment, e.g. carbon black | 10 | parts by weight |
|---|---|---|
| Copolyamide/cross-linking agent/solvent/curing agent mixture as above | 100 | " |

After the printed designs have been dried each is covered with a further continuous layer 8 of the same coating mixture and the sheet dried as before, and the sheet or marking elements or transfers cut from the sheet may be stored until required. For use the marking elements or transfers are applied under heat and pressure to an article to be marked and the temporary support 5 is finally stripped off. The marked article shows good resistance to laundering and cleaning. Heat-sealing may be effected at 2 to 4 kg. per sq. cm. and at a temperature of 200° C for 10 seconds.

The invention may be used for a number of related heat-sealing purposes in addition to the production of surface markings as explained by the following examples:

EXAMPLE 2

This example illustrates a labelling method using the resin system as a bonding medium.

20 gm. of a copolyamide selected from tables II and III are dissolved in 75.5 gm. of 80/20 by volume of isopropanol and water by high-speed stirring, and 6 gm. of a cross-linking agent selected from the above table; 0.5 gm. of citric acid and 2 gm. of ethyl toluene sulphonamide are also added. This solution is coated on to one side only of a closely woven cotton fabric, the coating weight being 60 gm. per sq. m. and then dried as in Example 1. The fabric is then printed on the uncoated side with any suitable ink including the ink of Example 1.

Labels cut from this coated fabric were heat-sealed on to garments using a pressure of 2 to 4 kg. per sq. cm. and at a temperature of 200° C for 10 seconds.

EXAMPLE 3

A heat transfer incorporating a surface capable of receiving handwritten information is prepared as follows in which all parts are be weight: i. 15 parts of a copolyamide selected from tables II and II are dissolved in 80 parts of an 80/20 by volume mixture of industrial ethyl alcohol and water by high speed stirring. 5 parts of a cross-linking agent selected from the above Table and 0.2 parts of citric acid are added (all parts by weight). From portions of this solution the following inks are prepared by ball milling: ii. 10 parts of solution (i) with 3 parts of cadmium red, iii. 10 parts of solution (i) with 5 parts of rutile titanium dioxide.

A temporary support consisting of a polyester film of 50 microns thickness is coated with a 10 micron (dry) layer of white ink (iii) and further coated with a 25 micron (dry) layer of solution (i). Another support is coated with a transparent 15 micron (dry) layer of solution (i). The products are dried and reeled and slit into strips of convenient width, e.g. the white coating into 5 cm. reels and the transparent coating into 6 cm. reels.

A heat-sealing machine working at 200° C and a ten seconds pressing period and exerting a specific pressure of 4 kg. per sq. cm. is used to apply the coated layers to a surface to be marked. For example a 2 cm. × 5 cm. piece of white strip is a heat-sealed on to a white overall, using a heat-sealing machine, and the polyester temporary support foil is removed. The name of the owner of the overall may then be written on, with a laundry marking ball-point pen, after which a piece of the transparent strip 2.5 cm. × 6 cm. is heat-sealed over it and the polyester foil removed. This label was found to be legible after 100 washes at a commercial laundry.

The red ink (ii) can be used to print the name of the institution owning the garments or linen on to the temporary support prior to coating with white ink and leaving room to write departmental or individual names on the printed surface after application and before the transparent strip is applied.

EXAMPLE 4

The following example illustrates a marking element as shown in FIG. 3 where a permanent support, rather than a temporary support, is used which becomes part of the label. The solutions used are similar to those of Example 3.

An absorbent base paper having a weight of about 40 gm. per sq. m. was used as the permanent support 5. This paper was impregnated with 15 gm. per sq. m. (dry) of solution (i) and then coated on one side only with 25 gm. per sq. m. (dry) of the same solution to form the layer 7. A design 6 was printed by the flexographic process using red ink (ii) on to the uncoated side of the paper. Labels were then cut from the paper and heat-sealed on to textile articles using a heat sealing machine set at 200° C, for 5 seconds, 3 kg. per sq. cm.

If a more opaque label is required, the white ink (iii) can be used to impregnate the paper in place of the solution (i).

Alternatively coloured and opaque white plastics base papers are commercially available. These labels show good resistance to dry-cleaning and domestic laundering.

Improved resistance to repeated commercial laundering can be achieved by a further coating 8 on the printed label (on the printed side) with 15 gm. per sq. m. of solution (i) followed by application at 150° to 250° C, as show in FIG. 4.

EXAMPLE 5

This illustrates a label in which only the design is transferred.

200 gm. of a copolyamide selected from tables II and III are dissolved in a mixture of 600 gm. of n-butanol and 150 gm. of water. To this solution is added 40 gm. of a cross-linking agent selected from table I and 10 gm. of ammonium dihydrogen citrate.

To 500 gm. of this solution are added 50 gm. of aluminium fine lining powder, which is thoroughly dispersed by high-speed stirring.

A design is printed by the screen method on to polyester film/paper laminate, using the metallic ink which can be applied to smooth textiles and shows satisfactory resistance to dry-cleaning.

If a further print using the unpigmented solution is printed in register on to the metallic design, a much stronger and more generally useful label results, which can withstand all but highly alkaline laundry treatments.

The use of copolyamide resin systems has been explained in substantial detail above although reference has been made to the use of addition resins which are formed from two or more monomers and the resin system employed including reactive groups, cross-linking groups and acidic or acid-forming groups. Such resins may be used in the form of dispersions or emulsions and are conveniently made from ethylenic compounds, usually by emulsion polymerisation. A large variety of substituted ethylene compounds can be employed, either along or in combination with others. This enables the "tailor-making" of resins having desired properties. Typical monomers are: styrene, vinyl chloride, methyl acrylate, vinylidene chloride, acrylonitrile, acrylamide, butadiene, divinylbenzene, methyl methacrylate, acrylic acid, etc.

The acidic groups or acid-forming groups serve as caring agents or catalysts and may consist of the acid or acid-yielding compounds referred to above. In general, substances the free acid of which has a pK value greater than 2 will be used, such acids being for example solid organic acids such as citric acid or salts of such acids with volatile bases such for example as ammonium citrate. In general, the amount used will be 0.1 to 10% by weight of the resin whether a separate acid is used or the acid grouping is present in the form of an acidic comonomer. In either case the acid may be neutralised by a volatile base. The acids used under such circumstances include acrylic acid, methacrylic acid, ethacrylic acid, vinyl acetic acid or p-carboxy styrene.

Any of the resin systems referred to herein may be associated with plasticisers and stabilisers, as explained with reference to the following compositions. The compositions below show that acid or acid-yielding groups, as such, may be omitted where for example the reactive monomer is an acid present in sufficient quantity, while the cross-linking agent may be omitted where for example the reactive monomer contains additional groupings capable of promoting cross-linking.

In all cases the resin systems referred to may be used as coating or impregnating products for permeable materials, for example as a coating on a fabric or on an absorbent paper, and such systems may also be used for the production of printing media for example for the production of information-bearing markings on layers bearing a continuous or discontinuous coating of the resin system as for example in the production of labels of transfers.

The following composition illustrate coating compositions or printing media according to the present invention in which parts are by weight in each case:

Composition 1
| I. acrylonitrile | 45 | parts |
| II. n-butyl acrylate | 54 | " |
| III. acrylic acid | 1 | part |
| IV. cross-linking agent selected from Table 1 as above | 20 | parts |
| V. citric acid | 0.5 | " |
| P. dibutyl phthalate | 5 | " |

Composition 2
| I. acrylonitrile | 40 | parts |
| II. n-butyl acrylate | 59.6 | " |
| III. acrylic acid | 0.4 | " |
| IV. cross-linking agent selected from Table I | 15 | " |

-continued

|  |  |  |
|---|---|---|
| as above |  |  |
| V. citric acid | 1 | part |
| Composition 3 |  |  |
| I. acrylonitrile | 50 | parts |
| II. n-butyl acrylate | 45 | " |
| III. acrylic acid | 5 | " |
| IV. cross-linking agent | 5 | " |
| P. tris-dipropylene glycol phosphite | 15 | " |
| Composition 4 |  |  |
| I. vinylidene cyanide | 34 | parts |
| II. vinyl benzoate | 65 | " |
| III. acrylamide | 1 | part |
| IV. cross-linking agent | 7 | parts |
| V. citric acid | 3 | " |
| P. N-ethyltoluene sulphonamide | 20 | " |
| Composition 5 |  |  |
| I. vinyl chloride | 75 | parts |
| II. vinylidene chloride | 23 | " |
| III. hydroxyethyl acrylate | 2 | " |
| IV. cross-linking agent | 5 | " |
| V. diammonium citrate | 1 | part |
| P. N-ethyl toluene sulphonamide | 10 | parts |
| S. barium/cadmium complex | 5 | " |
| Composition 6 |  |  |
| I. vinylidene chloride | 85 | parts |
| II. methyl acrylate | 12 | " |
| III. acrylic acid | 3 | " |
| IV. cross-linking agent | 5 | " |
| V. tartaric acid | 0.1 | parts |
| P. dioctyl phthalate | 10 | " |
| P. dibutyl phthalate | 10 | " |
| S. tin complex | 5 | " |
| Composition 7 |  |  |
| I. methacrylonitrile | 80 | parts |
| II. octyl acrylate | 19.5 | " |
| III. 0.5 acrylamide |  |  |
| IV. cross-linking agent | 10 | " |
| V. maleic anhydride | 0.5 | " |
| Composition 8 |  |  |
| I. vinyl acetate | 75 | parts |
| II. methyl methacrylate | 15 | " |
| III. butoxy-methyl acrylamide | 10 | " |
| IV. dibutyl hydrogen phosphate | 0.3 | parts |
| P. dibutyl phthalate | 15 | " |
| Composition 9 |  |  |
| I. styrene | 80 | parts |
| II. butadiene | 19 | " |
| III. hydroxyethyl acrylate | 1 | part |
| IV. cross-linking agent | 15 | parts |
| V. lactic acid | 1 | part |
| Composition 10 |  |  |
| I. chloro-acrylonitrile | 90 | parts |
| II. iso-decyl vinyl ether | 5 | " |
| III. maleic anhydride | 5 | " |
| IV. cross-linking agent | 10 | " |
| Composition 11 |  |  |
| I. acrylonitrile | 40 | parts |
| II. butyl acrylate | 55 | " |
| IIIa butoxy methyl acrylamide | 2 | " |
| IIIb acrylic acid | 3 | " |

In the above compositions the components I and II represent two film-forming comonomers selected so as to provide the property of producing coherent films having the required properties. Component III is the reactive monomer and in the case of composition 11 two such reactive monomers are present.

Component IV is the cross-linking agent, and it will be noted that no such component is present in compositions 8 and 11 since the reactive monomer contains groupings capable of promoting cross-linking under heat and pressure.

Similarly component V is the acid or acid-producing curing agent. No such curing agent is present in composition 3 or in compositions 10 and 11 since sufficient acid groups are present on the reactive monomer of component III. The additional components, especially plasticisers and stabilisers, are necessary in some cases to produce the required products. In the above compositions the components marked P are included as plasticisers and the components marked S are used as stabilizers. the two complex metal stabilisers referred to are commercially available compounds sold as polymer stabilizers.

In all cases the resulting copolymers are addition polymers and are capable of being prepared as dispersions in water or aqueous mixtures. For convenience the various polymers may be obtained by free radical catalysed emulsion polymerisation by known techniques.

In the production of coating composition using such dispersions a coating or printing medium may be prepared by first producing a resin dispersion by emulsion polymerisation having a 50% by weight solid content consisting of components I, II and III together with minor ingredients such as emulsifiers, initiators, catalysts or the like. The remaining components are conveniently added in a mixture with about 20% of the dispersions weight of a thickener such as hydroxyethyl cellulose solution.

Compositions prepared as above may be used as unpigmented coating mixtures the viscosity being adjusted to 20 to 50 poise at 10 reciprocal seconds by the addition of water or further hydroxyethyl cellulose solution.

Printing media may be made from such compositions using pigments as follows:

|  |  |  |  |
|---|---|---|---|
| i. Carbon black | to | 5% | of the resin dispersion weight |
| ii. {Phthalocyanine blue | | 10% | " |
| {Titanium dioxide | | 10% | " |
| iii. Cadmium red | | 20% | " |
| iv. Titanium dioxide | | 70% | " |
| v. A further unpigmented mixture is required. | | | |

In more detail the preparation of a printing ink may be performed as follows:

A resin dispersion is prepared by emulsion polymerisation, which comprises approximately 50% of water, 48% of polymer (which itself will comprise monomers I and II and the reactive monomer III) 1% of emulsifier and, 1% of the residual initiators, catalysts and like minor additions.

In 100 parts of dispersion are added 20 parts of a 50% solution of hydroxyethyl cellulose in water to give a viscosity of 20 poise (all viscosities are determined on a co-axial cylinder viscometer at 10 reciprocal seconds).

The other ingredients are prepared as follows:

A further quantity of hydroxyethyl cellulose solution equal to the volume of plasticiser and cross-linking agents etc. is further diluted with an equal volume of water, then 2% of a wetting agent such as sodium lauryl sulphate or a non-ionic wetting agent such as "Nonex 30" (registered trade mark of Union Carbide Ltd) is added followed by the plasticiser, stabilizer, pigments, cross-linking agents, curing agents, in each case in the order given after the preceding one has been dispersed. The two components are mixed prior to printing. The resulting mixture is generally stable for at least a few days and may be printed by for example screen printing as described in various other patents and applications. Printing is carried out on to a temporary released carrier such as a polyester or triacetate film which may be laminated to paper to reduce cost and to facilitate printing.

Printed products so produced have a relatively long shelf life and as a result of bonding under heat and pressure to a surface to be marked the resin system is cured with a comparatively short time cycle to form and inert and insoluble marking.

A similar dispersion prepared without pigment may be used as a transparent coating or impregnating layer or may be used as an undercoating layer on which printing is performed or may be used as a bonding layer for joining a support to an article to be marked and which carries a printed marking on the opposite face. This procedure permits transfers to be produced which may be applied on to a wide variety of textiles at typical applications of 200° C, 2 kg. per sq. for 10 seconds.

An alternative method of preparing inks from the resin emulsion is as follows:

The emulsion is coagulated by freezing to −20° C followed by thawing, filtering and drying. It is then dissolved in a suitable solvent (iso-butyl methyl ketone for composition 5 or xylene in the case of composition 9. Pigments etc. are then dispersed into the resin solution. The cross-linking agent and curing agent are dissolved in a suitable solvent, e.g. butanol, prior to addition to the resin solution, after dispersion of the other ingredients. Printing and application to the textile is carried out as before.

Printing media prepared according to items i and iv above may be printed on to a suitable support by screen printing; said support may consist of a laminate of 12 micron polyester film and a paper having a weight of 150 gram per square meter.

EXAMPLE 6

A design is printed through a 150 mesh screen to a dry thickness of about 15 microns using the printing inks i, ii or iii. There is no continuous layers of resin nor any additional protection on the design. Such transfers can be bonded to smooth fabrics by heat and pressure and after removal of the temporary support the transferred design shows moderate resistance to mild laundering and dry-cleaning.

EXAMPLE 7

Better resistance may be obtained by printing a clear unpigmented resin through the same screen and in register with the design to give a total dry thickness of about 30 microns. Such transfers can be bonded to a wide range of fabrics and show good resistance to repeated laundering and cleaning.

EXAMPLE 8

A black background is prepared by printing a design consisting of colours ii, iii or iv followed by a covering of i which may if desired be followed by a further covering of clear resin v. Such labels may be used in various shapes and sizes and may be bonded to textile articles to give attractive effects which show a very high degree of permanence. A similar construction may be adopted with a white background using printing medium iv followed by v.

EXAMPLE 9

A transparent label is produced in which a marking is printed between transparent layers by first applying a 20 micron layer of a clear mixture, printing the design in one or more colours followed by the application of a further unpigmented layer. Such a label after bonding to a textile article shows great resistance to repeated severe laundering and dry-cleaning.

EXAMPLE 10

This example illustrates a heat transfer prepared from an acrylic resin dispersion and is shown on FIG. 4.

100 parts of the acrylic acid resin dispersion known as Plextol B 58a were thickened with 4 parts of hydroxyethyl cellulose. To a portion of this, 20% of a predispersed carbon black aqueous paste, containing 30% of carbon black, was added. To a further portion, 10% of aluminium powder was added, with high-speed stirring.

A design 6 was screen printed on to polyester film 5 using the metallic ink, followed by a background layer of black ink mixture 10 microns thick in turn followed by an unpigmented layer 30 microns thick, together forming the layer 8 of FIG. 4.

These transfers were applied to textile articles at 200° C for 10 seconds at 2 kg/sq. cm.

EXAMPLE 11

This example illustrates a heat transfer consisting of the design pattern only as shown in FIG. 2.

The black ink of Example 10 was used to print a bold design 6, 30 microns in thickness on a polyester film 5 to form a heat transfer. This is applied to textiles at 200° C for 8 secs. at 4 kg/sq. cm. The transferred design resisted repeated laundering and cleaning the coated support operations.

In all the above examples the coated support is dried at a temperature below that at which curing of the resin or resin mixture occur, generally at a temperature not exceeding 90° C. The coated product then has a substantial shelf life and the coated articles can be stored for lengthy periods without curing occurring. When applied under heat and pressure to a textile article or garment these operations are performed at a temperature exceeding the curing temperature, normally over the range 100° to 250° C at which the coated layer enters the pores of the articles or garment and the transferred material is converted into the inert and insoluble form in situ on the article or garment

What we claim is:

1. A marking element including a temporary removable support and an information bearing marking on said support, said marking comprising a film-forming cross-linkable copolyamide resin system capable of being permanently bonded by heat and pressure to a flexible surface to be marked, said resin system comprising
   i. a copolymide obtained by copolymerization of at least one diamine, at least one aliphatic diacid, which may be combined in the form of a salt, and at least one further different compound selected from the group consisting of lactams, diamines and aliphatic diacids, said copolyamide being soluble in a solution of $C_1$-$C_5$ aliphatic alcohol and water and having a molecular weight of from 5,000 to 30,000 as determined by end group analysis;
   ii. 5 to 30% by weight of a cross-linking agent, for said copolyamide, having blocked cross-linking groups of the general formula -$NCH_2OR$ wherein R is a lower alkyl radical, and
   iii. 0.1 to 7% by weight of a curing agent capable of providing acid radicals characterized by acidic properties corresponding to a free acid having a pK value greater than 2, said resin system being curable under the action of heat and pressure to form an insoluble wear resistant marking on said surface.

2. A marking element according to claim 1 wherein the copolyamide has a molecular weight of from 8,000 to 20,000 as determined by end group analysis.

3. A marking element according to claim 1 wherein the copolyamide is prepared from 2 or more members selected from the group consisting of (i) lactams having 6 – 12 carbon atoms and (ii) salts of diamines and diacids, each having 4 – 12 carbon atoms.

4. A marking element according to claim 1 wherein the copolyamide is prepared from 2 or more members selected from the group consisting of (i) lactams having 6 – 12 carbon atoms, and (ii) equimolar mixtures of diamines and diacids, each having 4 – 12 carbon atoms.

5. A marking element according to claim 3 wherein the copolyamide is obtained from hexamethylene diamine adipate and $\epsilon$ - caprolactam.

6. A marking element according to claim 3 wherein the copolyamide is obtained from hexamethylene diamine adipate, $\epsilon$ - caprolactam and a compound selected from the group consisting of hexamethylene-diamine sebacate, bis-(aminocyclohexyl) methane adipate and bis-(aminocyclohexyl) -2,2 propane adipate.

7. A marking element according to claim 1 wherein the major component of the copolyamide is present in an amount not greater than 60% by weight of the total weight of copolyamide.

8. A marking element according to claim 1 wherein the cross-linking agent consists of a precondensed, formaldehyde or aminoplast resin containing alkoxy alkyl groups.

9. A marking element according to claim 8 wherein the cross-linking agent is a precondensed melamine formaldehyde resin containing methoxy methyl groups.

10. A marking element according to claim 8 wherein the cross-linking agent is a monomeric melamine compound, containing alkoxy alkyl groups, present in an amount of 5-40% by weight of the resin.

11. A marking element as claimed in claim 1 wherein the curing agent is selected from the group consisting of non-volatile organic acids, partially esterified phosphoric acids, anhydrides of the foregoing acids and salts of the foregoing acids and volatile bases.

12. A marking element as claimed in claim 11 wherein the curing agent is provided by a solid organic acid, its ammonium salt or its anhydride.

13. A marking element according to claim 1 wherein said copolyamide resin system comprises a continuous layer, there being an information bearing marking carried thereby.

14. A marking element according to claim 13 wherein the information bearing marking consists of the said copolyamide resin sytem.

* * * * *